United States Patent Office 3,592,808
Patented July 13, 1971

3,592,808
METHOD OF PRODUCING D-XYLO-HEXOFURAN-URONO-6,3-LACTONE-5-ULOSE PROTECTED IN 1,2-POSITION
Olof Theander, Sandgrand, Sweden, assignor to Aktiebolaget Bofors, Bofors, Sweden
No Drawing. Filed Dec. 23, 1968, Ser. No. 786,436
Claims priority, application Sweden, Dec. 22, 1967, 17,657/67
Int. Cl. C07c 47/18
U.S. Cl. 260—210         4 Claims

ABSTRACT OF THE DISCLOSURE

An improved method of preparing 1,2-O-isopropylidene-D-xylo-hexafuranurono-6,3-lactone-ulose from either 1,2-O-isopropylidene-α-D-glucofuranose or 1,2:5,6-bis-O-isopropylidene-α-D-glucofuranose by oxidizing with oxygen or an oxygen containing gas in the presence of a platinum catalyst at a pH below 6.

---

The present invention relates to a method of producing D-xylo-hexofuranurono-6,3-lactone-5-ulose protected in 1,2-position.

It is previously known that 1,2-O-isopropylidene-α-D-glucofuranose can be oxidized at a pH of between 7 and 9 with air in the presence of a platinum catalyst, so that 1,2-O-isopropylidene-α-D-glucofuranuronic acid is formed in the form of a salt. From this salt, after subsequently having removed the cation, 1,2-O-isopropylidene-α-D-glucofuranurono-6,3-lactone is obtained. It is also known that by using an active manganese dioxide or chromic acid, the last-mentioned product can be further oxidized to 1,2-O-isopropylidene-α-D-xylo-hexofuranurono-6,3-lactone-5-ulose, the yield then, however, being relatively low. For the production of the 1,2-O-isopropylidene-α-D-glucofuranose, starting material, glucose and acetone are allowed to react with each other in an acid medium. Then, in addition to the previously mentioned 1,2-isopropylidene compound, also the corresponding 1,2:5,6-diisopropylidene compound is obtained, and in order to obtain the 1,2-isopropylidene compound pure, as desired, the reaction mixture must be recrystallized, which of course involves losses in yield, and in addition thereto involves increased production costs. Thus, according to previously known procedures, when producing the D-xylo-hexofuranurono-6,3-lactone-5-ulose it is necessary to use a number of separate reaction steps and, among other things, to use expensive oxidizing agents. The combination of recrystallization, transfer of the uronic acid salt to the corresponding lactone, and two separate oxidation steps lead to a poor yield and involve high production costs.

Through the persent invention it has now become possible to overcome all of the above-mentioned disadvantages, and the invention thus makes it possible to obtain a D-xylo-hexofuranurono-6,3-lactone-5-ulose protected in 1,2-position directly from a D-glucose protected in 1,2-position and/or in 1,2:5,6-position. The invention thereby gives a possibility of obtaining the product desired using cheap starting materials and with a high yield in a single reaction step.

The method of producing D-xylo-hexofuranurono-6,3-lactone-5-ulose protected in 1,2-position is characterized according to the invention in that D-glucose protected in 1,2-position and/or in 1,2:5,6-position is subjected to a catalytic oxidation, using oxygen, air, or some other gas mixture containing oxygen at a pH of less than 6, particularly less than 4.5. The protection can appropriately be achieved by ketal groups, but also acetal groups can be used. As an example of a D-glucose compound that can be used, may be mentioned 1,2-O-isopropylidene-α-D-glucofuranose and/or 1,2:5,6-bis(O-isopropylidene)-α-D-glucofuranose. These two compounds individually, and particularly the mixture, can be produced cheaply and with a high yield from glucose. The catalyst used can be platinum and/or some other metal belonging to the platinum group. The catalyst may be used directly or precipitated on a carrier, such as carbon or aluminum oxide.

The characteristic feature of the reaction according to the present invention is thus that it has quite surprisingly proved to be possible to transfer, in one single step, a D-glucose protected in 1,2-position and even a D-glucose protected in 1,2:5,6-position to the corresponding xylo-hexofuranurono-6,3-lactone-5-ulose with the aid of catalytic oxidation with oxygen, air or some other gas mixture containing oxygen as an oxidation means. The catalytic oxidation is to be carried out in an acid medium, and this can be achieved through the addition of suitable acid substances. The acid reaction medium required can also be achieved without any such addition, owing to the fact that by oxidation, acid products are formed to a certain extent. The reaction can advantageously be carried out in a water solution, but other solvents, such as acetic acid, can also be used. The decisive factor is that the pH of the solution must not be higher than 6, and particularly not higher than 4.5.

The oxygen, air or other gas mixture containing oxygen used as an oxidation means should appropriately be added at atmospheric pressure, but an elevated pressure can also be used.

Platinum has proved to be suitable for use as a catalyst and can, for instance, be used in the form of so-called Adams catalysts, but also precipitated on carriers, such as carbon or aluminum oxide. In addition to platinum, other metals belonging to the platinum group can also be used, either precipitated on carriers or in some other form.

EXAMPLE 1

By allowing D-glucose and acetone to react with each other in an acid medium in an entirely conventional manner, a mixture consisting of approximately 90% 1,2:5,6-bis-(o-isopropylidene)-α D-glucofuranose (I) and approximately 10% 1,2-O-isopropylidene-α-D-glucofuranose (II) is obtained. One part by weight of this mixture was dissolved in 20 parts by weight of water, to which was added 0.4 part by weight of Adams platinum catalyst. The reaction mixture was stirred at 45° C., and oxygen is allowed to flow through the reaction mixture in the form of small bubbles which were added through a glass filter. Shortly after the oxygen had been passed in, the solution became acid, with a pH of approximately 3. After the reaction had proceeded for 7 hours, the charging of oxygen was discontinued. The catalyst was filtered off, and after evaporation, a crystalline residue was obtained, which proved to contain 1,2-O-isopropylidene-α-D-xylo-hexofuranurono-6,3-lactone-5-ulose (III) as the main component. The yield of the last-mentioned substance was approximately 50%, based on I+II. Pure 1,2-O-isopropylidene-α-D-xylo-hexofuranurono-6,3-lactone-5-ulose was obtained as a monohydrate through recrystallization of the raw residue from ethanol/benzene or water.

The reaction procedure is illustrated by the following structural formulae:

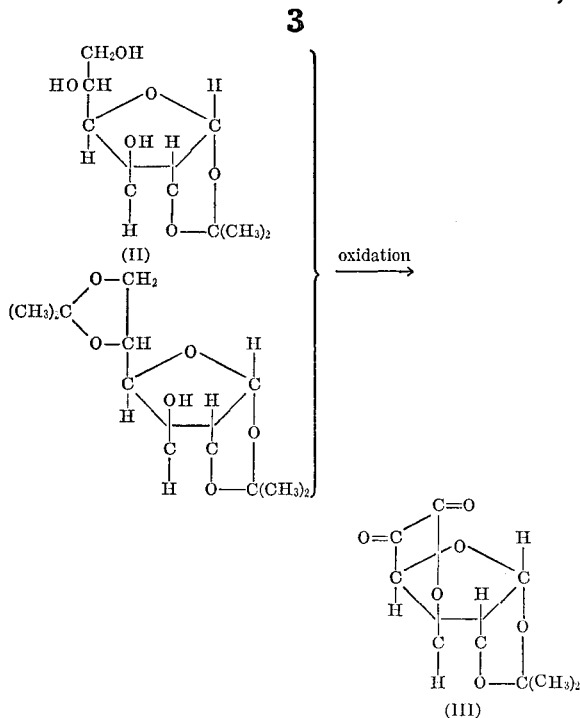

EXAMPLE 2

This example was carried out analogously with the foregoing one, but with the difference, however, that carbon on which 5% platinum had been precipitated was used as a catalyst. The results of this test corresponded to those obtained in the foregoing example.

EXAMPLE 3

In this example, a buffered solution was used, so that the reaction which, for the rest, was carried out in the same way as in the foregoing examples, took place at pH 6. In this test, only traces of 1,2-O-isopropylidene-α-D-xylo-hexofuranurono-6,3-lactone-5-luose (III) could be found, which clearly shows that the pH should be less than 6. Even when pure 1,2-isopropylidene-α-D-glucofuranose was used as a starting material, the same low yield of III was obtained.

EXAMPLE 4

In this example, the starting material and the reaction conditions were the same as for Example I, and the difference was that the reaction was allowed to take place at pH 4.5, by using a suitable buffering substance. In this example, a relatively good yield of 1,2-O-isopropylidene-α - D - xylo-hexofuranurono-6,3-lactone-5-ulose was obtained, although it was not as high as in Example 1. This shows that the reaction should preferably take place with a pH of less than 4.5.

EXAMPLE 5

10 parts by weight of 1,2-O-isopropylidene-α-D-glucofuranose (II) was dissolved in 50 parts by weight of water, after which acetic acid was added until the pH of the solution had decreased to 3. Thereafter 5 weight parts of Adams platinum catalyst was added, and oxygen was charged into the reaction mixture while stirring at 55° C. for 3 hours. After filtering off the catalyst and evaporating, a crystalline residue with 1,2-O-isopropylidene-α-D-xylo-hexofuranurono-6,3-lactone-5-ulose (III) as a main component was obtained. The yield of the last-mentioned substance was approximately 60% on the input quantity of II.

What is claimed is:

1. A method of preparing 1,2-O-isopropylidene-D-xylo-hexfuranurono-6,3-lactone-ulose which comprises oxidizing in aqueous solution at a pH below 6, 1,2-O-isopropylidene - α - D-glucofuranose or 1,2:5,6-bis-(O-isopropylidene)-α-D-glucofuranose in the presence of a platinum catalyst and a temperature the solution.

2. A method according to claim 1 wherein the pH is below about 4.5.

3. A method according to claim 2 wherein the oxygen containing gas is oxygen or air.

4. A method according to claim 1 wherein the platinum catalyst is precipitated on carbon or aluminum oxide.

References Cited

UNITED STATES PATENTS

| | | | |
|---|---|---|---|
| 2,190,377 | 2/1940 | Dalmer et al. | 260—210 |
| 2,715,121 | 8/1955 | Glen et al. | 260—210 |
| 3,231,560 | 1/1966 | Keen et al. | 260—209 |

LEWIS GOTTS, Primary Examiner

J. R. BROWN, Assistant Examiner

U.S. Cl. X.R.

260—209